(12) United States Patent
Lenger

(10) Patent No.: US 8,471,725 B2
(45) Date of Patent: Jun. 25, 2013

(54) METHODS AND SUPPORTING TELEMETRY TO DETERMINE, MONITOR AND CONTROL THE METAGENOMIC AND PHYSICAL STATES OF GREASE INTERCEPTORS, FOGS, VAULTS AND OTHER WASTE COLLECTING ENCLOSURES

(76) Inventor: Markus Johannes Lenger, Waikoloa, HI (US)

( * ) Notice: Subject to any disclaimer, the term of this patent is extended or adjusted under 35 U.S.C. 154(b) by 1263 days.

(21) Appl. No.: 12/258,432

(22) Filed: Oct. 26, 2008

(65) Prior Publication Data
US 2009/0109057 A1   Apr. 30, 2009

Related U.S. Application Data

(60) Provisional application No. 61/000,711, filed on Oct. 26, 2007.

(51) Int. Cl.
*H04Q 9/00* (2006.01)
(52) U.S. Cl.
USPC .................................................. 340/870.07
(58) Field of Classification Search
USPC ...................... 340/870.07; 435/29–40; 73/866
See application file for complete search history.

(56) References Cited

U.S. PATENT DOCUMENTS

| | | | | |
|---|---|---|---|---|
| 5,049,492 | A * | 9/1991 | Sauer et al. | 435/30 |
| 5,742,517 | A * | 4/1998 | Van Den Bosch | 382/141 |
| 7,009,698 | B2 * | 3/2006 | Drost et al. | 356/241.1 |
| 7,073,979 | B2 * | 7/2006 | McGrew et al. | 405/184.2 |
| 8,024,066 | B2 * | 9/2011 | Reverte et al. | 700/245 |
| 2003/0082516 | A1 * | 5/2003 | Straus | 435/4 |
| 2004/0089075 | A1 * | 5/2004 | Behm et al. | 73/753 |
| 2004/0211272 | A1 * | 10/2004 | Aronstam et al. | 73/866.5 |
| 2005/0277186 | A1 * | 12/2005 | Fein et al. | 435/288.7 |
| 2006/0290779 | A1 * | 12/2006 | Reverte et al. | 348/84 |
| 2007/0251337 | A1 * | 11/2007 | Reed et al. | 73/866 |
| 2008/0032420 | A1 * | 2/2008 | Lambert et al. | 436/514 |
| 2008/0118912 | A1 * | 5/2008 | Dickson et al. | 435/6 |
| 2009/0115628 | A1 * | 5/2009 | Dicks et al. | 340/870.07 |

* cited by examiner

*Primary Examiner* — Fritz M Fleming

(57) ABSTRACT

A system capable of ascertaining, determining, monitoring and controlling the biological state of and metagenomic state of microbial colonies as well as the physical state of waste liquids in grease interceptors, vaults and other waste collecting enclosures. The system consists of an array of cameras (14) a multi-phased sonar array (18), pH in (42)/pH out (24) and delta temperature arrays (36, 44), redundant liquid level sensors (10, 12), a nutrient measurement array (30, 32) and dissolved oxygen sensor (22). These sensors are mounted inside a grease interceptor (2) or waste collecting enclosure and enable accurate monitoring and control of all physical and biological processes to enable, optimize and control bioremediation processes. Continuous optimized control algorithms are either generated locally or updated remotely via internet or modem connection. All data is collected, logged in a Control/Telemetry Unit (20) and can be retrieved either locally or remotely via internet or modem connection.

13 Claims, 2 Drawing Sheets

Figure 1:
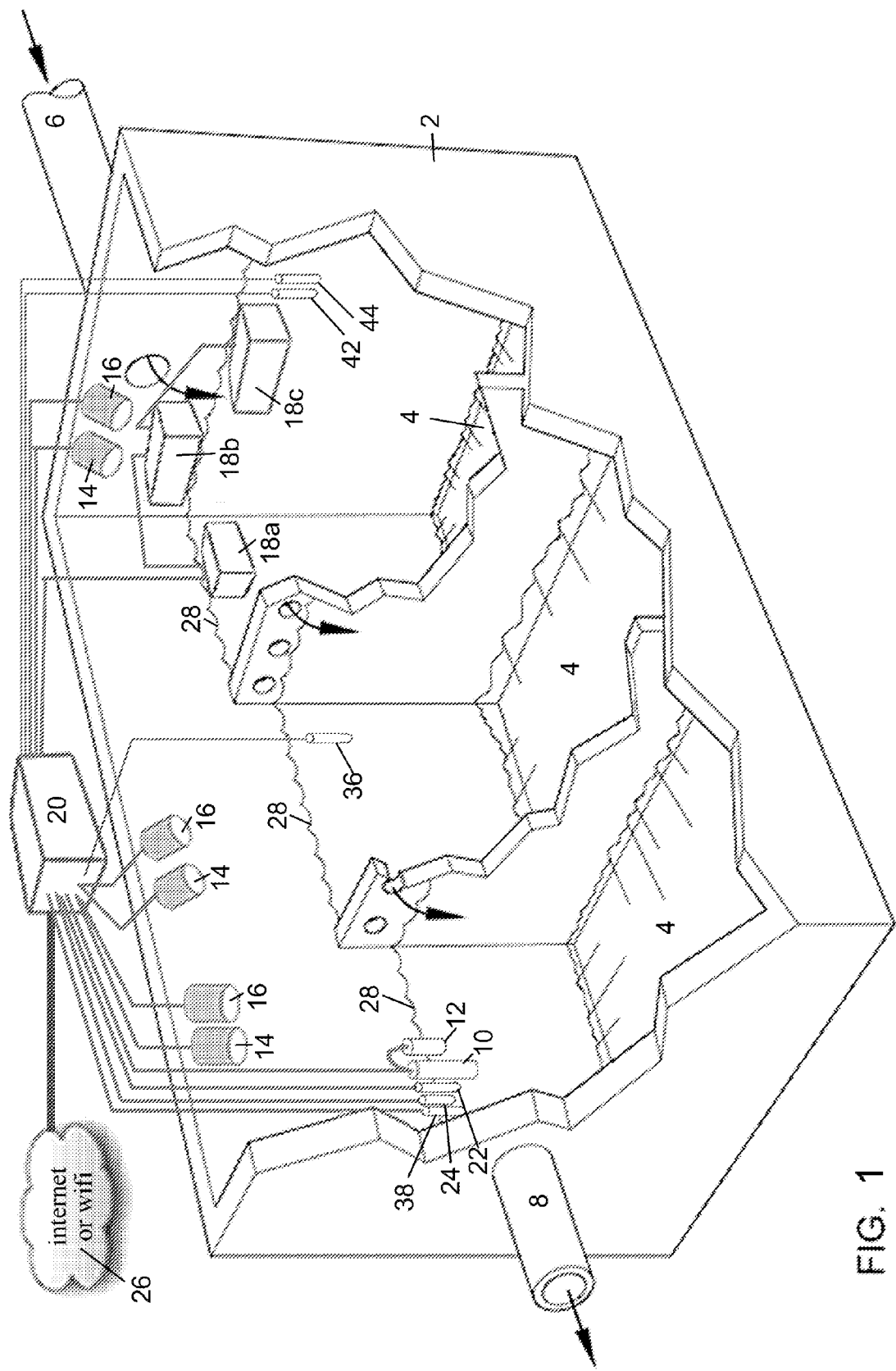

METHODS AND SUPPORTING TELEMETRY TO DETERMINE, MONITOR AND CONTROL THE METAGENOMIC AND PHYSICAL STATES OF GREASE INTERCEPTORS, FOGS, VAULTS AND OTHER WASTE COLLECTING ENCLOSURES

CROSS-REFERENCE TO RELATED APPLICATIONS

This application claims the benefit of provisional patent application Ser. No. 61/000,711 filed 2007 Oct. 26 by the present inventor.

FEDERALLY SPONSORED RESEARCH

Not Applicable

SEQUENCE LISTING OR PROGRAM

Not Applicable

BACKGROUND-FIELD OF INVENTION

This invention relates to wastewater and solid treatment, specifically the control and optimization of bioremediation of Grease and Biosolids in Grease Interceptors, Vaults and other Waste collection enclosures I have invented these methods and supporting telemetry to enable the monitoring, logging and control of grease interceptors, grease traps, grease vaults and other waste collecting enclosures. Although this invention is perfectly capable of being used as a stand-alone embodiment, it was tested non-commercially over the last 5 years together with a device for in-situ bioremediation of liquid waste (PTO provisional patent application 60/760, 458 with filing date of Jan. 20, 2006, PTO Ser. No. 11/779, 841 with filing date of Jul. 18, 2007) to establish reducing it to practical application.

BACKGROUND-PRIOR ART

Food service establishments produce Fats, Oils and Grease commonly referred to as FOG. It is prohibited to discharge FOG directly into the sewer system. A grease interceptor or grease vault is commonly installed prior to discharge into the municipal sewer system. It consists of multiple chambers that trap the FOG. The food service establishments' effluent is routed through this grease interceptor's feed by gravity alone. Grease interceptors then capture the FOG and other biosolids by means of gravity separation and flotation. Its function is identical to an oil/water separator. Depending on the amount of FOG/biosolids contained in the discharge, the grease interceptors fill up with solids and need to be pumped empty. This operation is usually performed several times a year. The FOG-water mixture is either disposed in a landfill, processed at a suitable wastewater treatment plant or reprocessed. It also necessitates transport of hazardous material and the excavation (pumping) procedure which is noisy, creates lingering bad odor, is a health risk and expensive. It has been established that most grease interceptors are poorly maintained and therefore are failing in their function to hold back the FOG. As a result FOG reaches the sewer system and clogs lift (pump) stations and sewer lines. These conditions are one of the main contributors to SSO's (Sanitary Sewer Overflows) resulting in huge fines for cities and water districts, beach closures and a multitude of health and environmental hazards. Since foodservice establishments are odor sensitive and there is a growing environmental concern and regulation regarding safe transporting and disposing of FOG, a method of in-situ (inside the grease interceptor) is desirable. In order to control and maximize such a system regardless of its scientific approach or method, continuous accurate data as well as the current state of a grease interceptor, vault or waste collection enclosure is desired and essential for the continuous reliable operation of such a system. The embodiment of this invention consists of several parts listed below. These parts may be used in any combination to collect the required data set so an installed system can be optimized and achieve its maximum performance.

Although video image processing, level sensing, sonar imaging, pH and temperature measurement has become common practice in some applications, prior art searches showed that this combination of technologies has never been used nor any of its components nor has it in its partial or total interaction ever been used inside grease interceptors, grease vaults or grease traps or other waste collection enclosures. The observation, measurement and controlling of metagenomic behavior, its influencing and its communication to achieve faster bioremediation and adaption rates, has to the inventor's knowledge never been reduced to practice in any application. Metagenomics is a scientific field that studies the colonial behavior of microbial cultures and its mean of communicating among those cultures. Understanding the metagenomic dynamics of a microbial process such as bioremediation greatly increases its efficiency and enables to produce better and consistent results.

DETAILED DESCRIPTION

Figure 2:

FIGS. 1 AND 2—Illustrated Embodiment

Cameras (14)

Each grease interceptor (GI) chamber (4) contains a top mounted camera (14) generating video imaging and processing employing pulsed ultra violet LED (30) for illumination to detect the UV absorption in the 320 to 350 nanometer range via image with content detection. The UV spectral feedback is in direct proportion to the FOG (Fats, Oil, Grease) content of the grease interceptor surface (28). This will generate not only a contact-less measurement method for determining grease content but also produce live still and motion images which can be viewed, broadcasted via air or the internet or any applicable or future medium to either water districts, plant supervisors, city engineers or any other person needing a visual confirmation of the state of the grease interceptor current and prior, since the images can be recorded in time lapse fashion thus generating a permanent record that can be stored on any data storage system that is granted access to our system. These image data are extremely helpful for preventive maintenance or scheduling pumping of the grease interceptor if needed. The system can also be used to visually verify an alarm condition reported by the redundant level sensors mounted inside the grease interceptors. This allows a determination of the best course of action to rectify any potential problems.

1. Redundant Liquid Level Indicators:

Since plumbing code only requires a retention time of thirty minutes, and even large grease interceptors have only discharge pipe diameters of 4 inches or less, overflow can occur easily due to blockage of the small diameter outflow pipes by either excessive grease build up or accidental introduction of foreign objects. Given the short retention time of a grease interceptor, most interceptors will fill up and overflow in a matter of minutes if the discharge is clogged. The EPA adopted a zero tolerance program especially in coastal areas for FOG to hit either storm drains, bodies of water or the ocean. Seven figure fines are becoming more common if beach closures are involved and thus the liability for restaurants is as such that even one incident can put them out of business. To alleviate this potential risk, a redundant 2 step level sensor and alarm system is incorporated to alert staff and or authorities of an impending cloggage. The first level switch is positioned in a way that will trigger an alarm if GI liquid level is elevated by 3 inches. While not characteristic for clogging it clearly indicates a flow problem. Trained personnel on-site or remotely, are directed to visually check the levels via the integrated live video feed. A second level alarm is located 6 inches above the nominal GI liquid level and triggers a more severe alarm. This will indicate clear evidence of cloggage and alert staff and or authorities of immediate countermeasures (e.g. lock out of dishwashers, shut down of kitchens preventing flow of grease to GI, etc.) Level sensing can be achieved by either ultrasonic, Doppler radar, mechanical flow switch or similar means. The switches are directly tied in to the monitoring telemetry system. This system will issue the appropriate alarms/alerts by means of phone calls, SMS, email, pagers, audible and visual alarms, local and or remote.

2. pH in/pH Out and Delta Temp

In order to monitor metagenomic biological activity, establishing the health of the microbial community (used in the bioremediation of grease interceptors as sited in patent application above) a careful monitoring of certain key parameters is necessary. Since the biochemical breakdown produces only the by-products $H_2O$, $CO_2$ and less than 0.1% biomass, only $CO_2$ represents a meaningful, measurable value. The $CO_2$ produced by this biochemical process is dissolved in water, thus forming carbonic acid, similar to the process of soda water. This dissolved carbonic acid, acts as a pH buffer lowering the overall pH by driving it slightly more acidic.

Biological remediation also produces considerable amounts of excess heat so temperature sensors that measure the difference (delta) between ambient and bioelement core temperature are also indicators for a desired biological activity. Measuring pH input and comparing it to pH output, deriving the delta pH and correlating it with the delta temperature, gives an immediate feedback of the metagenomic state of the biology. This parameter can be used to allow the control/telemetry unit to increase/decrease aeration inside the chambers, add desired pH buffers, to keep the grease interceptor in a pH neutral range of 6.5-8.5. It also enables the dispensing of bionutrients and other biochemical markers to control and stimulate the metagenomic community, thus protecting its metagenomic environment.

3. Sonar

A highly modified multi-faced multi transducer transceiver sonar array is employed to measure, triangulate, monitor and visualize, key parameters such as density, foreign objects, temperature layers and other key properties of the liquid in a grease interceptor. A full UV visible to infrared tunable light source, based on LEDs, can also be employed to extend the visual detection range of elements by using the principles of photo-spectrometry whereas the video camera acts as a detector. This information can be correlated with the signal processing unit of the sonar, thus generating sophisticated real-time $3d$ imaging of the true state of the GI as well as its chemical makeup. Flow data can also be derived by some simple algorithms.

4. Nutrient Measurement

Nutrient measurement in the form of total nitrogen, phosphorous and potassium analysis can be employed once a cost effective method becomes available.

5. Dissolved Oxygen

Dissolved oxygen (DO) is measured to ascertain available oxygen to the microbes and metagenomic community and possible interference with chemotaxis. Its output can also be used to control aeration of the chambers in the grease vault and to determine possible formation of hydrogen sulfide. Additionally, a hydrogen sulfide sensor can also be added to report to the control/telemetry system for recording counter measurement and injection of odor suppressants or other odor control measures.

6. Live Image Feed Status Check

Live image feed is also generated by the cameras to be used for visual inspection, check status and liquid level during alarm conditions and to get a visual feedback for the amount of liquid in the GI. These video images can be distributed to maintenance personnel, executives and directors, water districts, the manufacturer, service contractor, as well as any other party interested in such images and information including the posting of live video feed on websites, either public or with restricted access.

7. Acceptable pH Levels

The system is designed to protect the metagenomic environment, meaning maintaining the integral health of the microbial community, keeping pH levels within not only acceptable discharge range, but also within range to not interfere with the chemotaxis communication between microbes. Additionally, if the pH range becomes critical, pH buffers may be injected automatically with the guidance of the control/telemetry unit.

DRAWINGS

I have included two drawing sheets.
FIG. 1: An elevated front perspective cut away view of the devices installed in a typical layout for a grease interceptor
FIG. 2: Close up Photograph of the UV/VIS Camera

| Drawings-Reference Numerals | |
|---|---|
| 2 | Grease Interceptor |
| 4 | Interceptor Chambers |
| 6 | Inflow Pipe |
| 8 | Outflow Pipe |
| 10 | Lower level Sensor |
| 12 | Higher Level Sensor |
| 14 | UV/VIS/IR Cameras |
| 16 | Full Spectrum Phasing LED Array |
| 18 | Multi Phased, Multi Transducer/Transceiver Array |
| 18a | X-Axis Transducer/Transceiver |
| 18b | Z-Axis Transducer/Transceiver |
| 18c | Y-Axis Transducer/Transceiver |
| 20 | Control/Telemetry Unit |
| 22 | Dissolved Oxygen Probe |
| 24 | pH Sensor |
| 26 | Network Connection |
| 28 | Liquid Level |
| 30 | UV LED Lights |
| 32 | CCD Imager |
| 34 | Water Tight Enclosure |
| 36 | Delta Temperature Sensor |
| 38 | Outflow Temperature Sensor |
| 42 | Inflow pH Sensor |
| 44 | Inflow Temperature Sensor |

Operations—FIGS. 1,2

The Grease Interceptor (GI) 2 consists of chambers 4, typically more than one chamber form an interceptor (the drawing shows a grease interceptor with 3 chambers). The GI 2 is connected and fed from the kitchens or food establishments via the inflow pipe 6. After passing through the GI 2 by flowing through the chambers 4 the grease/water fluid is discharged into the municipal sewer system via outflow pipe 8. Redundant Level sensors 10 and 12 detect abnormal conditions in the liquid level 28 indicating a blockage in outflow pipe 8 that would cause a SSO (Sanitary Sewer Overflow) resulting in huge fines and severe environmental impact. The redundant level sensors 10 and 12 consists of two sensors—the first level sensor 10 is mounted to trigger a high level alarm when the liquid level 28 is elevated by approximately 3 in. The second level sensor 12 is located 6 inches above the normal liquid level 28 triggering a second, more severe alarm. Both sensors are wired into the control/telemetry system 20. The UV/VIS/IR cameras 14 are mounted to produce a visual image of each chamber 4. The pulsing and/or continuous mode UV LED lights 30 will cause the grease on the chamber 4 surface at liquid level 28 to illuminate white. The CCD imager 32 is in the center of the pulsing and/or continuous mode UV LED lights 30 and will capture either an image or live video and feed it back to the control/telemetry system 20 for white content analysis, thus enabling precise determination of grease content. Both the CCD imager 32 and the pulsing and/or continuous mode UV LED lights 30 are housed in a water tight enclosure 34. Optional full spectrum phasing LED arrays 16 can illuminate/pulse the grease water mixtures at select and or sweeping wavelengths characteristic for pollutants or contents of the liquid employing standard photo-spectrometric processing using UV/VIS/IR camera 14. A multi phased, multi transducer/transceiver array 18 is connected to the control/telemetry unit 20. Its three sensors represent the X-Y-Z axes needed to compute the location and identification of various parameters. Transducer/Transceiver 18a generates the x axes and is located just below the liquid level 28, Transducer/Transceiver 18b generates the z axes and is located just above but in physical contact with the liquid level 28. Transducer/Transceiver 18c generates the y axis and is located just below the liquid level 28. Together they constitute the multi phased, multi transducer/transceiver array 18. A dissolved oxygen (DO) sensor 22 is immersed below the liquid level 28 and transmits the DO level to the control/telemetry unit 20. A pH sensor 24 records pH of the discharge liquid and sends it to the control/telemetry unit 20 to determine delta pH. An outflow temperature sensor 38 records and transmits outflow temperatures to control/telemetry unit 20. An additional temperature sensor 36 is installed for each additional chamber, to establish inflow temperature and pH needed to calculate delta temperatures and delta pH's, which in turn allow determination of biological activity/metagenomic state consist of inflow pH sensor 42, and inflow temperature sensor 44. Temperature sensor 37 may also be used to determine ambient GI temperature for delta temperature comparison in control/telemetry unit 20. The control/telemetry unit 20 is capable of reading all telemetry, video and water quality parameters, as well as sonar imaging. It is of expandable nature and fully software and hardware upgradeable to suit future needs. The unit is connected to a network 26 and if desired, internet 26, via either WIFI connection 26 or physical networking cable or any other means to network/communicate with the control/telemetry unit 20 either locally or remotely via LAN/WAN the internet (TCP/IP or other protocols) or via telephone dial-up.

There are many alternative ways this systems can be used:
Waste water treatment plants may use this system as well
Agricultural waste applications could also deploy this system
Advantages From the descriptions above, a number of advantages of the illustrated embodiment of my methods and supporting telemetry to determine, monitor and control the metagenomic and physical states of grease interceptors, FOG's, vaults and other waste collecting enclosures, become evident:

(a) The camera system not only generates a live image, which is extremely helpful for preventative maintenance or scheduling pumping of the grease interceptor if needed. It also aids in visually verifying alarm conditions generated by the telemetry system. Further image processing can also detect levels by verifying the presence of objects or visual targets mounted within a grease interceptor, vault or waste collecting enclosure. These objects and visual targets such as a Secci disk, color target or an existing component such for example the pipes or other types of visible fixtures are brought into the camera system's field of view and therefore readily available image processing algorithms can detect abnormal levels of liquid, once said objects or visual targets have been flooded due to high liquid levels and are therefore no longer visible. This condition then would trigger an adequate level alarm.

(b) pH in/pH out and the delta temperature can monitor the metagenomic state of the bioremediation process and therefore are a direct indicator of the biological health and activity of the microbial colony. Redundant level sensing not only alarms of abnormal or dangerous conditions as well as elevated levels and imminent overflow, but is also able to detect search flows that may adversely affect the retention time of grease interceptors, vaults and other waste collecting enclosures.

(c) The sonar component of the system allows 3D visualization of the solid liquid layers and the biological activity layers, indicating the various breakdown components that occur during a full bioremediation process.

(d) The UV LEDs that are either integrated into the camera system or deployed as an external illumination system using either pulsed or continuous UV illumination are able in cooperation with the camera's image sensor to detect grease levels on the liquid's surface by measuring the white content of the image. This system takes advantage of the fact that FOG reflects UV light in form of a broad white spectrum light (white) and therefore is in direct relation to the actual FOG content.

(e) Nutrient measurement can be achieved by using an array of LEDs including UV visible and infrared light to assemble a simple but highly effective LED photospectrometer that can measure the nutrients main components, nitrogen, phosphorous and potassium. It is known that nitrogen for example can be measured with the absorbance of UV light in the 290 nanometer range.

(f) Dissolved oxygen measurements can be automatically correlated with the other parameters to not only measure actual oxygen content but to compute and predict oxygen availability for the ongoing bioremediation process and enables the control/telemetry unit to refine its algorithms to optimize the bioremediation process.

CONCLUSIONS, RAMIFICATIONS, AND SCOPE

Thus the reader will see that at least one embodiment of my methods and supporting telemetry to determine, monitor and control the metagenomic and physical states of grease interceptors, FOG's, vaults and other waste collecting enclosures, provides a reliable, continuous way to monitor all physical and biological aspects of grease interceptors, vaults and waste collecting enclosures at low cost. The system is easy to maintain and only contains a limited number of liquid immersed sensors. The majority of the sensors are contact free.

Furthermore, my methods and supporting telemetry to determine, monitor and control the metagenomic and physical states of grease interceptors, FOG's, vaults and other waste collecting enclosures has the additional advantages in that:

- It accurately ascertains the metagenomic and physical state of grease interceptors, vaults and waste collecting enclosures.
- All data collected is continuously logged in the telemetry control unit and can be accessed by internet either locally or by modems' dial up lines. Control algorithms executed can be changed or rewritten either locally or remotely via a Modem, LAN or internet connection, or simply optimized via executables running inside the telemetry controller unit thus allowing a continuous and automated optimization of the process giving the utmost flexibility and adaptability to ever changing conditions found in grease interceptors, vaults and waste collecting enclosures.
- Accurate data can be obtained, stored and retrieved about nutrient levels in the waste liquid as well as grease levels, allowing to build historical data and to greatly assist in optimization and preventative maintenance.
- Periodical pulling and storing of the camera images allow the assembly of time lapse movies that greatly assist in trouble shooting, generate a permanent record and produce the audit-able log that can be shared with authorities if such a need arises.
- The redundant 2 stage level sensing gives a low cost, reliable and highly effective method of identifying troublesome conditions or elevated liquid levels right at the onset therefore allowing the proper course of action to prevent overflow and spillage on to streets, parking lots, environments or bodies of waters, which can result in hefty fines and considerable reputational damage to a food proprietor.

While my above description contains many specificities, these should not be construed as limitations on the scope of the invention, but rather as an exemplification of on [or several] preferred embodiment thereof. Many other variations are possible. Not all methods mentioned above need to be present to get useful control data. For example, UV pulsing or illumination alone can be substituted with a fully tunable full spectrum LED base or other light source thus allowing the detection of many more pollutants allowing an even more precise assertion of the chemical, biological and physical makeup of the waste liquid. This system can also be used in animal waste lagoons such as hog lagoons, dairy lagoons etc. Treatment capabilities in septic tanks, waste water treatment basins etc. can drastically improve when deploying this system.

Thus the scope of the embodiment should be determined by the appended claims and their legal equivalents, rather than by the example given.

I claim:

1. A system of ascertaining, determining, monitoring and controlling the biological and metagenomic state of microbial colonies and the physical state of waste liquids in a waste collecting enclosure comprising the following elements:
   (a) a central control/telemetry processing unit located in a remote location from said vault;
   (b) an image processor imbedded in said central control/telemetry processing unit capable of detecting and calculating white content of an image;
   (c) a video camera mounted inside said enclosure capable of imaging visible and ultra violet light connected to said central control/telemetry processing unit;
   (d) a ultra violet LED light source mounted inside said enclosure;
   (e) a multi-faced multi transducer transceiver sonar array mounted inside said enclosure connected to said central control/telemetry processing unit;
   (f) a pH in/pH out and delta temperature sensor array mounted inside said enclosure connected to said central control/telemetry processing unit;
   (g) a redundant liquid level sensor mounted inside said enclosure enabling lower and upper level reading connected to said central control/telemetry processing unit;
   (h) a delta temperature sensor mounted inside said enclosure capable of measuring temperature differences between inflow and outflow temperature connected to said central control/telemetry processing unit;
   (i) a full UV, visible to infrared tunable LED light source with corresponding image sensor mounted inside said enclosure to measure nutrient loading connected to said central control/telemetry processing unit;
   (j) a dissolved oxygen probe mounted inside said enclosure connected to said central control/telemetry processing unit;
   whereby the system will generate data to allow accurate monitoring and control of all physical and biological processes to enable, optimize and control bioremediation processes.

2. The system of claim 1 wherein said unit is communicating with a network or modem.

3. The system of claim 1 where the UV LED illuminates the field of view of the video camera and produces a video image.

4. The system of claim 3, wherein said video image of is sent to said image processor embedded in the central control/telemetry processing unit.

5. The system of claim 1, wherein said image processor algorithmically detects and calculates the white content of the image captured from the video camera.

6. The system of claim 5, wherein said detection and calculation is assigned a corresponding numerical value by the image processor and sent to the central control/telemetry processing unit.

7. The system of claim 1, wherein said multi-faced multi transducer transceiver sonar array sends 3D image data to said image processor.

8. The system of claim 1 wherein said redundant liquid level sensor is triggering an alarm signal to central control/telemetry processing unit.

9. The system of claim 6 wherein said full UV, visible to infrared tunable light source with corresponding image sensor therefore is measuring current nutrient levels at relevant wave lengths and assigns a corresponding numerical value.

10. The system of claim 9, wherein the central control/telemetry processing unit algorithmically calculates the difference between the inflow pH value and the outflow pH value and assigns a corresponding numerical value.

11. The system of claim 1, wherein the central control/telemetry processing unit algorithmically calculates the difference between the inflow temperature value and the outflow temperature value and assigns a corresponding numerical value.

12. The system of claim 10, wherein the control/telemetry processing unit algorithmically adds the numerical values and outputs the resulting value as a biological activity measure.

13. The system of claim 12 algorithmically compares the biological activity measure with the white content value to determine biological and metagenomic state of microbial colonies, whereby said determination is able to generate instructions to control cultivation cycles, injection intervals and the microbial concentrate amounts to be added from an attached inoculation or bioremediation system.

\* \* \* \* \*